(12) United States Patent
Tamminga

(10) Patent No.: US 6,328,465 B1
(45) Date of Patent: Dec. 11, 2001

(54) VERTICAL FEED MIXER WITH AUGER HAVING CENTER POST WITH SLOPED TOP

(75) Inventor: Jacob R. Tamminga, Orton (CA)

(73) Assignee: Jay-Lor Fabricating Inc., Orton (CA)

( * ) Notice: Subject to any disclaimer, the term of this patent is extended or adjusted under 35 U.S.C. 154(b) by 0 days.

(21) Appl. No.: 09/638,023

(22) Filed: Aug. 14, 2000

Related U.S. Application Data
(60) Provisional application No. 60/148,587, filed on Aug. 13, 1999.

(51) Int. Cl.[7] .............................. B01F 7/24; B02B 3/06; B02C 18/08
(52) U.S. Cl. ................. 366/314; 366/319; 241/260.1; 241/261.1; 241/605
(58) Field of Search ............................... 366/314, 319, 366/320, 322, 323, 324, 279; 241/46.17, 101.76, 101.761, 260.1, 605, 186.5, 261.1

(56) References Cited

U.S. PATENT DOCUMENTS

| | | | |
|---|---|---|---|
| 4,413,789 | * | 11/1983 | Rienecker et al. . |
| 4,607,802 | * | 8/1986 | Lamort . |
| 4,725,007 | * | 2/1988 | Chupka . |
| 4,949,916 | * | 8/1990 | Wroblewski . |
| 4,984,900 | * | 1/1991 | Faccia . |
| 5,020,918 | * | 6/1991 | Faccia . |
| 5,082,188 | * | 1/1992 | Urich . |
| 5,240,321 | * | 8/1993 | Miller . |
| 5,294,064 | * | 3/1994 | Faccia . |
| 5,429,436 | * | 7/1995 | Stone . |
| 5,456,416 | * | 10/1995 | Hartwig . |
| 5,462,354 | * | 10/1995 | Neier . |
| 5,553,937 | * | 9/1996 | Faccia . |
| 5,615,839 | * | 4/1997 | Hartwig . |
| 5,647,665 | * | 7/1997 | Schuler . |
| 5,823,449 | * | 10/1998 | Kooima et al. . |
| 5,863,122 | * | 1/1999 | Tamminga . |

* cited by examiner

Primary Examiner—Tony G. Soohoo
(74) Attorney, Agent, or Firm—Daryl W. Schnurr

(57) ABSTRACT

A vertical feed mixer has an auger with a center post that has an inclined upper surface that is substantially flat. Flights of varying shapes can be used. The upper part of the flight extends above the upper surface. The inclined upper surface increases the versatility and efficiency of the mixer since feed bales are unlikely to block the mixer.

12 Claims, 5 Drawing Sheets

VERTICAL FEED MIXER WITH AUGER HAVING CENTER POST WITH SLOPED TOP

This application claims the benefit of provisional application No. 60/148,587, filed Aug. 13, 1999.

BACKGROUND OF THE INVENTION

1. Field of the Invention

This invention relates to a vertical feed mixer for use in mixing animal feed and, in particular, hay in any form including round bales with other animal feed. In particular, this invention relates to a vertical feed mixer having an auger with a center post and a helical flight extending around said post where the post has an upper surface that is inclined relative to said center axis.

2. Description of the Prior Art

Feed mixers of various forms are known and, in particular, feed mixers for mixing round bales of hay or haylage of any size, including large and small bales with other animal feedstuffs including corn silage, commodities, byproducts and concentrates are known. Previous vertical feed mixers have a vertically mounted auger having a helically-shaped expanding periphery that is narrowest at a top and increases in size towards the base. It is known to have blades mounted periodically along the periphery of the auger. The periphery is smoothly curved in the form of a spiral and expands from top to bottom. These blades are sometimes serrated knives. Alternatively, the auger can have a flight that has a series of straight sections as described in U.S. Pat. No. 5,863,122, issued Jan. 26, 1999. Sometimes, with previous mixers, when a large bale is inserted into the mixer, the bale becomes wedged between a wall of a mixing chamber and the auger with one part of the bale resting on the top of the auger. When a bale is inserted in this position, the bale can remain in that position for a relatively long time before ultimately being broken up by the auger. The time involved obviously varies with the positioning of the bale, but the wrong bale positioning can lead to serious problems. For example, the operator of the mixer might physically attempt to dislodge the blockage and that can be dangerous or unsafe. Also, the efficiency of the mixer is greatly reduced when this type of blockage occurs.

SUMMARY OF THE INVENTION

It is an object of the present invention to provide a vertical feed mixer with an auger having a center post that is inclined relative to the center axis at the top with part of a flight extending above the sloped surface.

A vertical feed mixer has a mixing chamber containing a substantially vertical rotatable auger having a center post with a generally helical flight that is tapered to converge from bottom to top. The flight extends around the center post and has a periphery. There are power means to rotate the auger about a longitudinal center axis. The chamber has at least one opening to receive and discharge feed. The center post has an upper surface that is inclined relative to the center axis.

A vertical feed mixer has a mixing chamber containing a substantially vertical rotatable auger having a center post with a generally helical flight that is tapered to converge from bottom to top. The flight extends around the center post and has a periphery. There are power means to rotate the auger about a longitudinal center axis. The chamber has at least one opening to receive and discharge feed. The center post has an upper surface that is inclined relative to the center axis and the top of the flight extends above the upper surface.

Preferably, the upper surface lies substantially in one plane.

DESCRIPTION OF A PREFERRED EMBODIMENT

Figure 1:
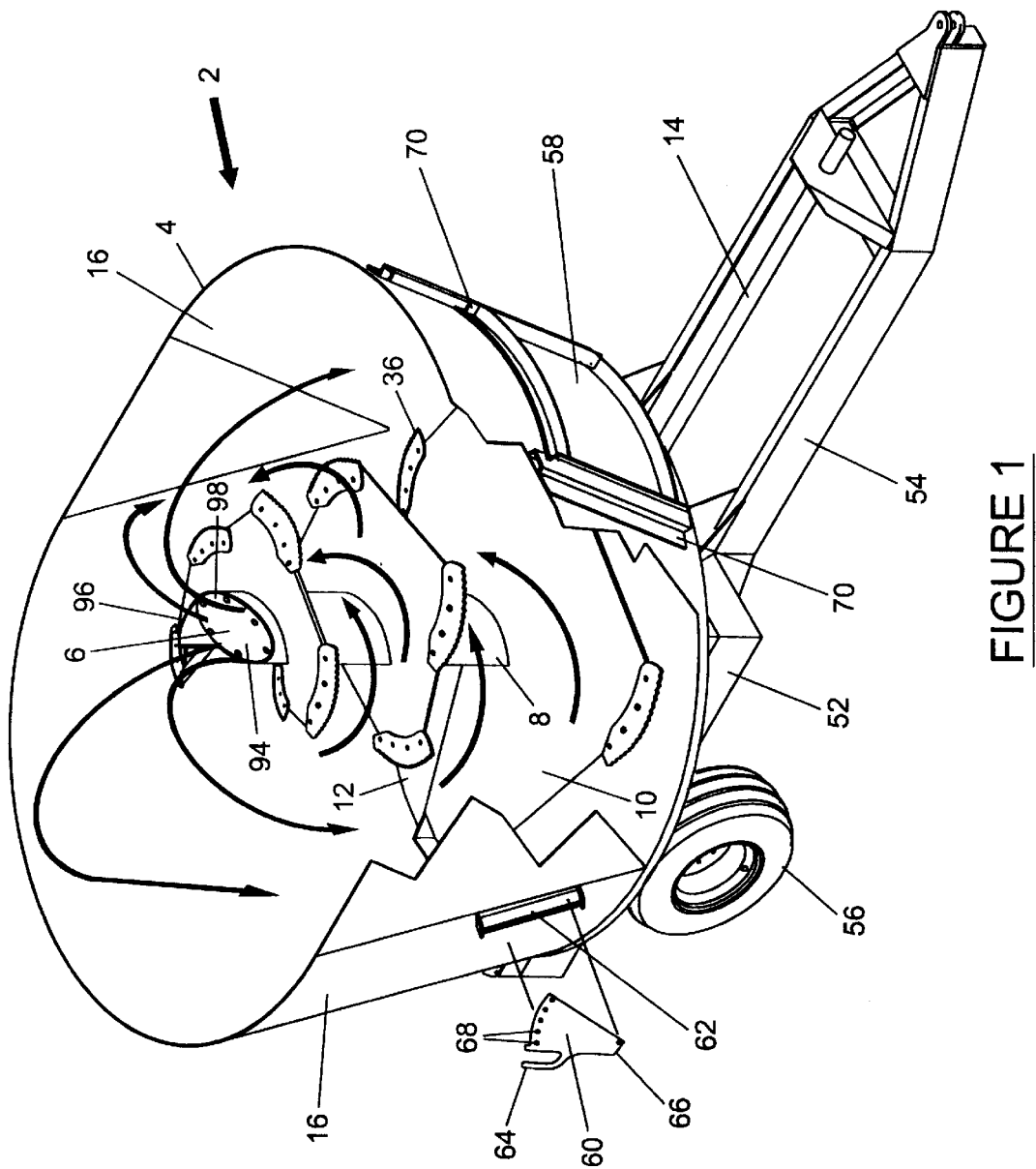
FIG. 1 is a partially cut-away perspective view of a vertical feed mixer to expose a straight-sided auger having a center post with a sloped upper surface.
Figure 2:
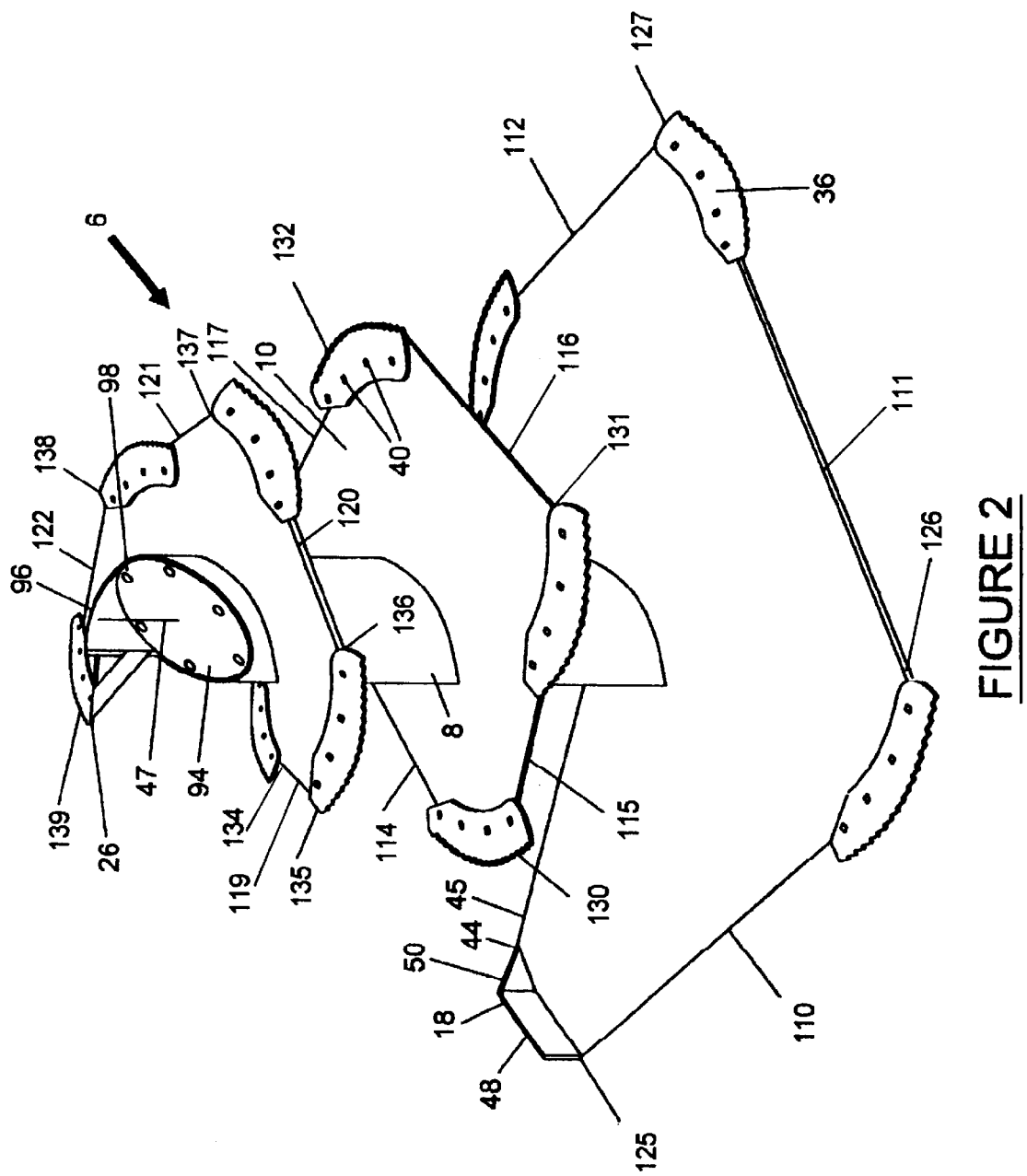
FIG. 2 is a perspective view of the auger of the mixer of FIG. 1.
Figure 3:
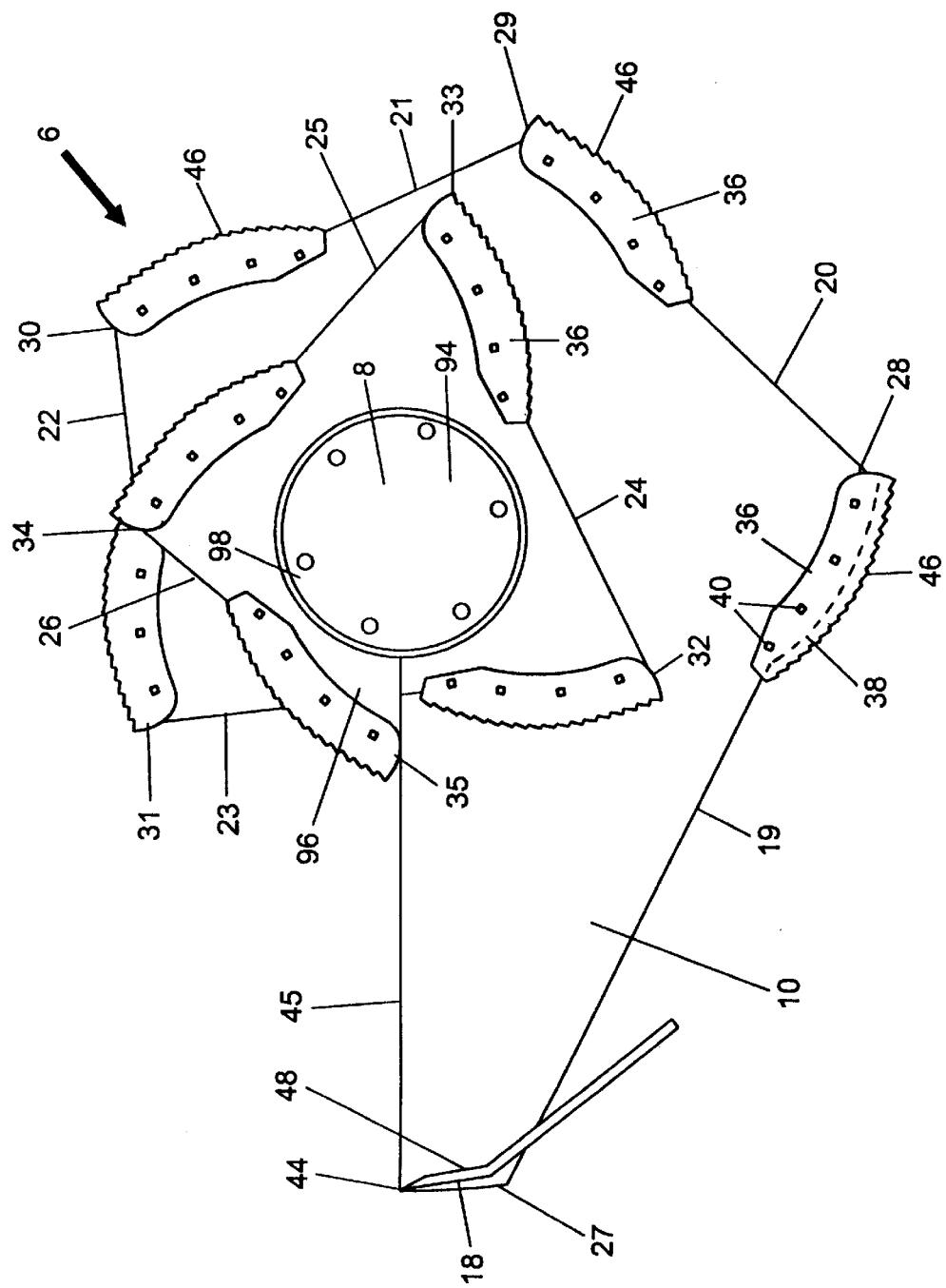
FIG. 3 is a top view of a straight sided auger that is smaller than the auger of the mixer of FIGS. 1 and 2.

In FIGS. 1, 2 and 3, a vertical feed mixer 2 has a mixing chamber 4 containing an auger 6. The auger is vertically mounted to rotate within the chamber 4 about its longitudinal center axis. The auger 6 has a center post 8 with a generally helically-shaped flight 10 extending from a top of said post 8 to a base thereof. The mixing chamber 4 has a floor 12 and the post 8 extends through the floor 12 to a gearing mechanism (not shown in FIG. 1) that is connected to a horizontal shaft 14. The post 8, the gearing mechanism (not shown in FIG. 1) and the shaft 14 are conventional. The flight 10 increases in size from the top of the auger 6 to the base thereof. Just above the floor 12, the flight 10 is preferably sized to extend almost to an interior of a wall 16 of the chamber 4. The wall 16 diverges from bottom to top of the chamber 4.

Preferably, an outermost edge 18 has approximately a one-quarter inch clearance from the interior wall 16 as the auger rotates. The outermost edge 18 can be straight, but preferably has an arcuate shape.

As best seen in FIG. 3, a periphery of the flight 10 has a plurality of substantially straight sections 19, 20, 21, 22, 23, 24, 25, 26 located in succession along said periphery. The flight 10 has corners 27, 28, 29, 30, 31, 32, 33, 34, 35 where the corner 27 is a first corner and the corner 35 is a last corner. The remaining corners 28, 29,30, 31, 32,33, 34 are located at an intersection of two substantially straight sections. Each substantially straight section has a leading end and a trailing end relative to a direction of rotation of the auger. In FIGS. 2 and 3, the auger will rotate clockwise when viewed from above.

Except for the first corner 27, each of the remaining corners has a horizontal blade 36 mounted on a trailing end thereof As can be seen from the dotted line at the corner 28, the periphery of the flight 10 has an outward curve 38 at each of said corners 28, 29, 30, 31, 32, 33, 34, 35 so that the horizontal blade 36 can be affixed to each corner by rivets (or other fastening means) 40. That part of the periphery extending between each of the horizontal blades 36 and the corners 27, 28, 29, 30, 31, 32, 33, 34 is straight.

In FIG. 2, the auger 6 has thirteen substantially straight sections (two of which are hidden) 110, 111, 112, 114, 115, 116, 117, 119, 120, 121, 122. Successive straight sections are separated by corners. The flight 10 has corners 125, 126, 127, 130, 131, 132, 134, 135, 136, 137, 138, 139 shown in FIG. 2. Three of the corners (not shown) are hidden by other parts of the drawing. It can be seen that the auger shown in FIG. 3 is small than the auger shown in FIG. 1 and 2.

The actual angles for each of the corners of the flight can vary with the size of the flight and the length of the substantially straight sections. Also, while the angles specified describe an auger that works well, the invention is not in any way restricted to specific angles. In FIG. 3, the angle of the first corner 27 is approximately 122°; the angle of the next corner 28 is approximately 105°; the angle of the next corner 29 is approximately 110°; the angle of the next corner 30 is approximately 106°; the angle of the next corner 31 is approximately 105°; the angle of the next corner 32 is approximately 103°; the angle of the next corner 33 is approximately 94°; the angle of the next corner 34 is approximately 100°; and the angle of the last corner 35 is approximately 55°. There is no horizontal blade at the first corner 27. The first corner 27 is connected to an outer end 44 of a lower leading edge 45 extending radially outward from the post 8 to the periphery at the outer edge 18. The outer edge 18 can be straight, but is preferably curved to form an arc of an imaginary circle with the leading edge 45 about a longitudinal center axis 47 of the auger 6. The periphery of the flight 10 from the outer end 44 to the post 8 meets the post radially just as the periphery of the flight 10 extending from the corner 35 to the post 8 meets the post radially.

From FIG. 3, it can be seen that the periphery of the flight 10 extending between the corner 20 and the post 8 and the periphery extending between the outer end 44 and the post 8 lie vertically above one another with the flight 10 extending for two complete turns about the post 8. Preferably, the flight 10 and auger 6 have a minimum of 1.5 turns about the imaginary center axis 47 of the post 8. Still more preferably, the flight extends for approximately two turns about the post 8. The blades 36 have serrated outer edges 46 that extend outward from each substantially straight section. The edge of each blade 36 is arc-shaped. There is one vertical blade 48 mounted on a surface of the flight 10 near the first corner 27. The vertical blade 48 has a central portion that curves or bends outward slightly from said center axis and moves the mixture towards the center of the mixer. In some designs, a second vertical blade (not shown) is located towards the post 8 from the blade 48. The vertical blade 48 has a serrated upper edge 50 and is turned inward slightly from the direction of rotation. The flight has a lower leading edge that extends outward to the periphery.

From FIG. 1, it can be seen that the mixer 2 has a frame 52 with a tongue 54 and wheels 56 (only one of which is shown). The shaft 14 is designed to be connected to the power take-off (not shown) of a tractor (not shown). The chamber 4 has a discharge opening 58. A triangular baffle 60 is mounted in a slot 62 within the wall 16 of the chamber 4. The baffle 60 has a handle 64 and is pivotally mounted within the slot 62 at a base 66 in a conventional manner. A series of openings 68 along the upper edge of the baffle 60 represent degrees of penetration of the baffle within the chamber 4. A pin (not shown) is inserted into one of the openings 68 and into an opening (not shown) on a flange (not shown) in the wall 16 of chamber 4 to fix the degree of penetration by the baffle 60 into the chamber 4. When the handle is manipulated to insert the baffle into the chamber as far as it can be inserted, a finer mixture (not shown) results than would occur when the handle is manipulated so that the baffle 60 does not extend into the chamber 4. Intermediate coarseness of the mixture results from intermediate settings. The frame, tongue, wheels, baffle, opening and chamber are conventional.

From FIGS. 1,2 and 3, it can be seen that the center post 8 has an upper surface 94 that is inclined relative to the longitudinal axis about which the auger rotates. Preferably, a top portion 96 of the flight 10 extends above the upper surface 94. Preferably, the upper surface 94 extends substantially from one side of the center post 8 to the other side of the center post 8. Preferably, the slope of the upper surface is substantially uniform across said post. Preferably, the upper surface lies substantially in one plane. It can be seen that the sloped surface 94 is oriented so that the top portion 96 of the flight is above the uppermost part 98 of the upper surface 94 and the flight then extends below the sloped surface as it continues around the center post. When a bale is placed on top of the center post, the bale will slide down the sloped surface. Also, the top portion of the flight will cut into the bale as the auger rotates, thereby causing the bale to fall further onto the auger. While it is preferable that a flight with corners and straight sections be used, a flight with a rounded periphery can also be used with the sloped upper surface of the present invention.

Figure 4:
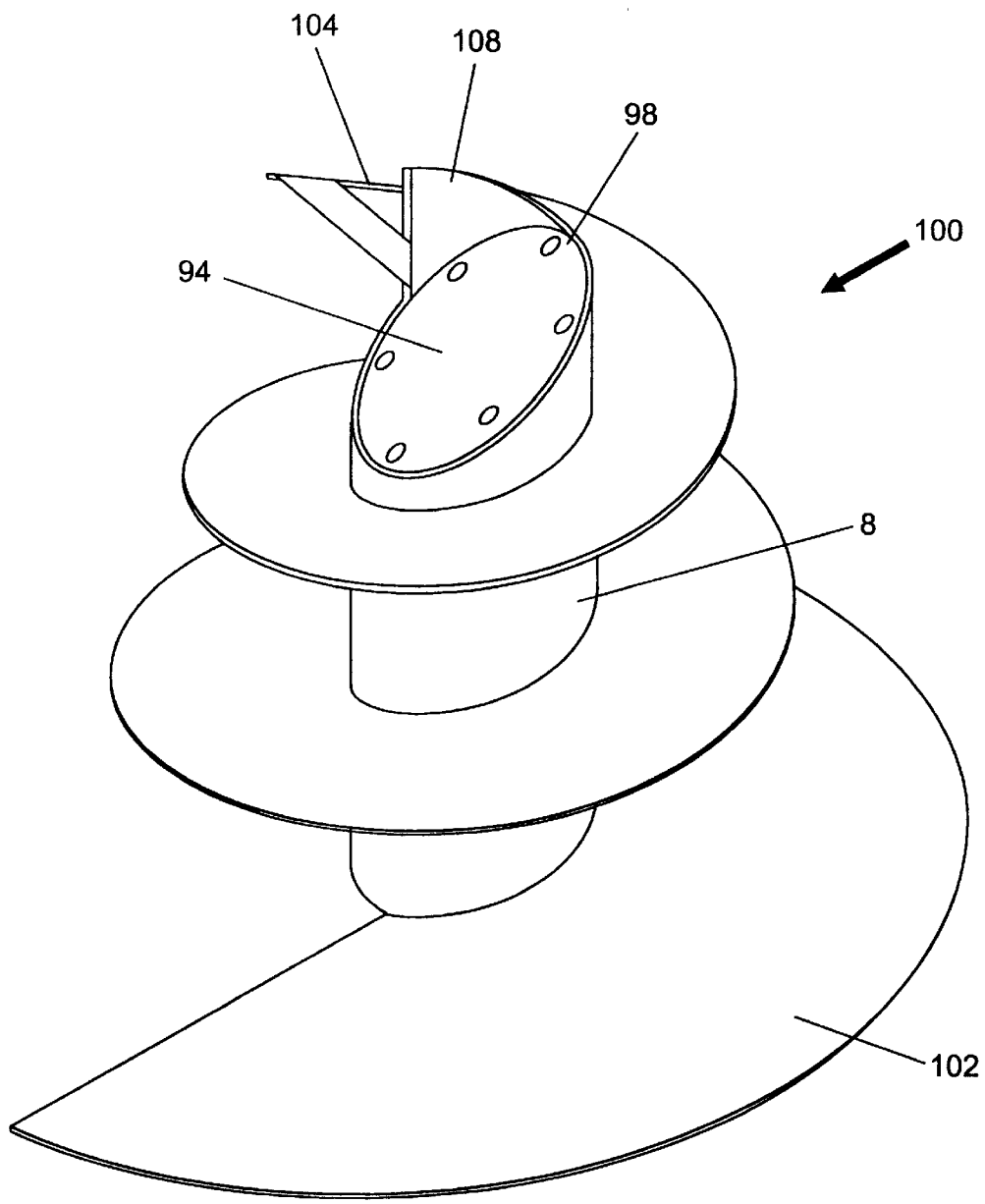
FIG. 4 is a perspective view of a further embodiment of a helical auger with a center post having a sloped upper surface.

In FIG. 4, there is shown an auger 100 having a center post 8 with an upper surface 94. The auger 100 has a flight 102 that has a helical shape and converges from bottom to top. A top portion 104 of the flight 102 extends above the uppermost part 98 of the upper surface 94. Also, part 108 of the post 8 extends above the upper surface 94 to provide support for the flight. The periphery is arcuate. The cutting blades on the helical auger 100 are conventional and have been omitted. Various cutting blades (not shown) can be located along a periphery of the auger. The auger 100 can be used in place of the auger 6 shown in FIG. 1.

The arrows shown in FIG. 1 within the chamber 4 show the general movement of materials (not shown) that make up the mixture (not shown) during mixing. The auger 6 revolves clockwise when viewed from the top.

In a further embodiment (not shown) of the invention, an electric motor can be used. When an electric motor is used, only one tractor will be required to operate the mixer. That tractor will be used to load the mixer, the auger being rotated by the electric motor.

In operation, a round bale or other haylage is inserted into the mixer along with any other feedstuffs that are desired to be mixed with the hay. The auger is rotating as the mixing ingredients are being inserted and the auger continues to rotate until the desired degree of mixing is achieved and the mixed material is removed. When the mixing has been completed, the door 58 is raised (it slides upward along side ridges 70) and the mixture is removed by the auger which continues to rotate. Various conveyors (not shown) can be included to transport the mixture where desired. When the mixer is empty or nearly empty, the opening 58 is closed and the process is repeated to create another mixture.

Figure 5:
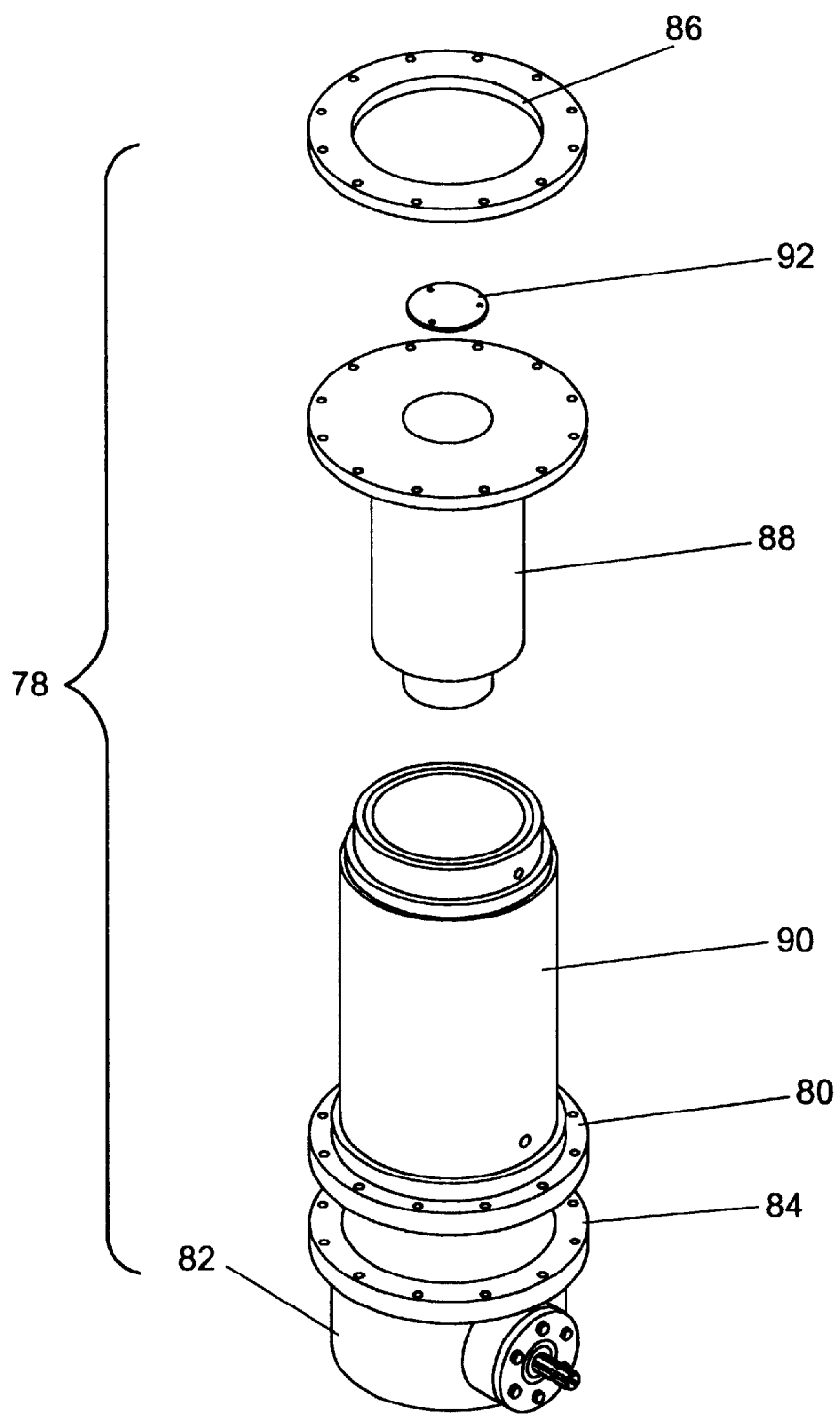
FIG. 5 is an exploded perspective view of a prior art bearing tower and gearbox.

In FIG. 5, a bearing tower 78 has a flange 80 with a gearbox 82 affixed to said flange 80 by a corresponding flange 84 using bolts and nuts (not shown). The tower 78 is mounted inside the center post 8 (not shown in FIG. 5) of the auger 6 (not shown in FIG. 5). A ring 86 at a top of the tower 78 is welded to an inside of the post 8 (not shown in FIG. 5). The ring 86 is bolted to an inner tower 88 by bolts and nuts (not shown). The inner tower 88 is slidably mounted into an outer tower 90 that is welded to a floor 12 (not shown in FIG. 5) of the mixing chamber 4 (not shown in FIG. 5). The gearbox 82 is mounted beneath the tower 78. A small ring 92 couples the gearbox 82 to the inner tower 88 by bolts and nuts (not shown). This connection is made inside the inner tower 88 and the actual connection is not shown in FIG. 5. The tower 78 and gearbox 82 are conventional and are therefore not further discussed.

While the augers 6,100 extend for two complete revolutions around the post 8, other auger designs might extend further than or less than two revolutions. Other augers might have more corners or fewer corners or might have fewer horizontal blades or more horizontal blades. The periphery of the auger itself could be sharpened to form a blade that is integral with the flight. The advantage of using blades that are riveted or affixed by other fastening means to the flight is that the blades can be replaced when they become worn or damaged or can be easily sharpened when they become dull. The flight of the auger could have a greater slope or a lesser slope than that of the augers shown in the drawings.

Each horizontal blade 36 has a forward end and a rearward end relative to the direction of rotation. Preferably, the substantially straight sections have sufficient length and are oriented so that the rearward end of each blade is a greater distance from the center axis of the auger than the forward end of each blade. Still more preferably, the rearward end of each blade is greater than four inches further from the center axis than the foward end of the same blade. When the substantially straight sections are adjacent to one another, a first corner is located at a leading end of the first section and the last corner is located at a trailing end of the last section. In addition, there is a corner at the intersection of every two adjacent sections. The rearward end of each blade 36 extends to a corner and there is one blade at each corner except for the first corner. Preferably, when the flight extends for two turns, the auger has eight substantially straight sections and eight corners in addition to the first corner. A second corner is located immediately after the first corner along the periphery and the second corner has a first blade with a rearward located a distance of approximately 5.75 inches further from the center axis of the auger than a distance at the forward end of the same blade from the center axis. A third corner is located immediately after the second corner and the third corner has a second blade with a rearward end located a distance of approximately 5.25 inches further from said center axis than the forward end of the same blade. The remaining, blades are located at the remaining corners above said second blade along said periphery having rearward ends that are located a distance of approximately 4.5 inches further from the center axis of the auger than the forward end of each of these remaining blades.

The sloped upper surface extends substantially across the center post and lies substantially within the same plane though the sloped surface could be somewhat concave or convex or have a varying slope and a bale would still slide off the surface. Also, a wall of the post 8 extends upward beyond the upper surface and is shaped to have a sharp corner that can cut into the bale. The part of the wall of the auger extending above the upper surface also provides support for that part of the flight that extends above the upper surface. The upper surface is preferably substantially flat. Preferably, the upper surface has a slope greater than a slope of that part of the flight extending around said upper surface.

I claim:

1. A vertical feed mixer comprising a mixing chamber containing a substantially vertical rotatable auger having a center post with a generally helical flight that is tapered to converge from bottom to top, said flight extending around said center post and having a periphery, with power means to rotate said auger about a longitudinal center axis, said mixing chamber having at least one opening to receive and discharge said feed, said center post having an upper surface that is inclined relative to said center axis and lies substantially in one plane.

2. A feed mixer as claimed in claim 1 wherein a top of said flight extends above said upper surface.

3. A feed mixer as claimed in claim 2 wherein said top of said flight is supported by a wall that extends upward from said center post beyond said upper surface.

4. A vertical feed mixer as claimed in claim 2 wherein said periphery of said flight has cutting means thereon.

5. A vertical feed mixer as claimed in any one of claims 1, 2 or 3 wherein said periphery of said flight is smoothly curved.

6. A vertical feed mixer as claimed in any one of claims 1, 2 or 3 wherein said periphery of said flight has at least three consecutive substantially straight sections thereon.

7. A vertical feed mixer as claimed in any one of claims 1, 2 or 3 wherein said periphery of said flight has at least seven consecutive substantially straight sections thereon.

8. A vertical feed mixer as claimed in any one of claims 1, 2 or 3 wherein said upper surface has a slope greater than a slope of that part of said flight extending around said upper surface.

9. A vertical feed mixer as claimed in any one of claims 1, 2 or 3 wherein said wall has a sharp corner.

10. A vertical feed mixer having a mixing chamber comprising a substantially vertical rotatable auger having a center post with a generally helical flight that is tapered to converge from bottom to top, said flight extending around said center post and having a periphery, with power means to rotate said auger about a longitudinal center axis, said chamber having at least one opening to receive and discharge feed, said center post having an upper surface that is inclined relative to said center axis and a top of said flight extending above said upper surface, said top of said flight being supported by a wall that extends upward from said center post beyond id upper surface.

11. A feed mixer as claimed in claim 10 wherein said upper surface lies in substantially one plane.

12. A vertical feed mixer as claimed in claim 11 wherein said periphery of said flight has cutting means thereon.

* * * * *